UNITED STATES PATENT OFFICE.

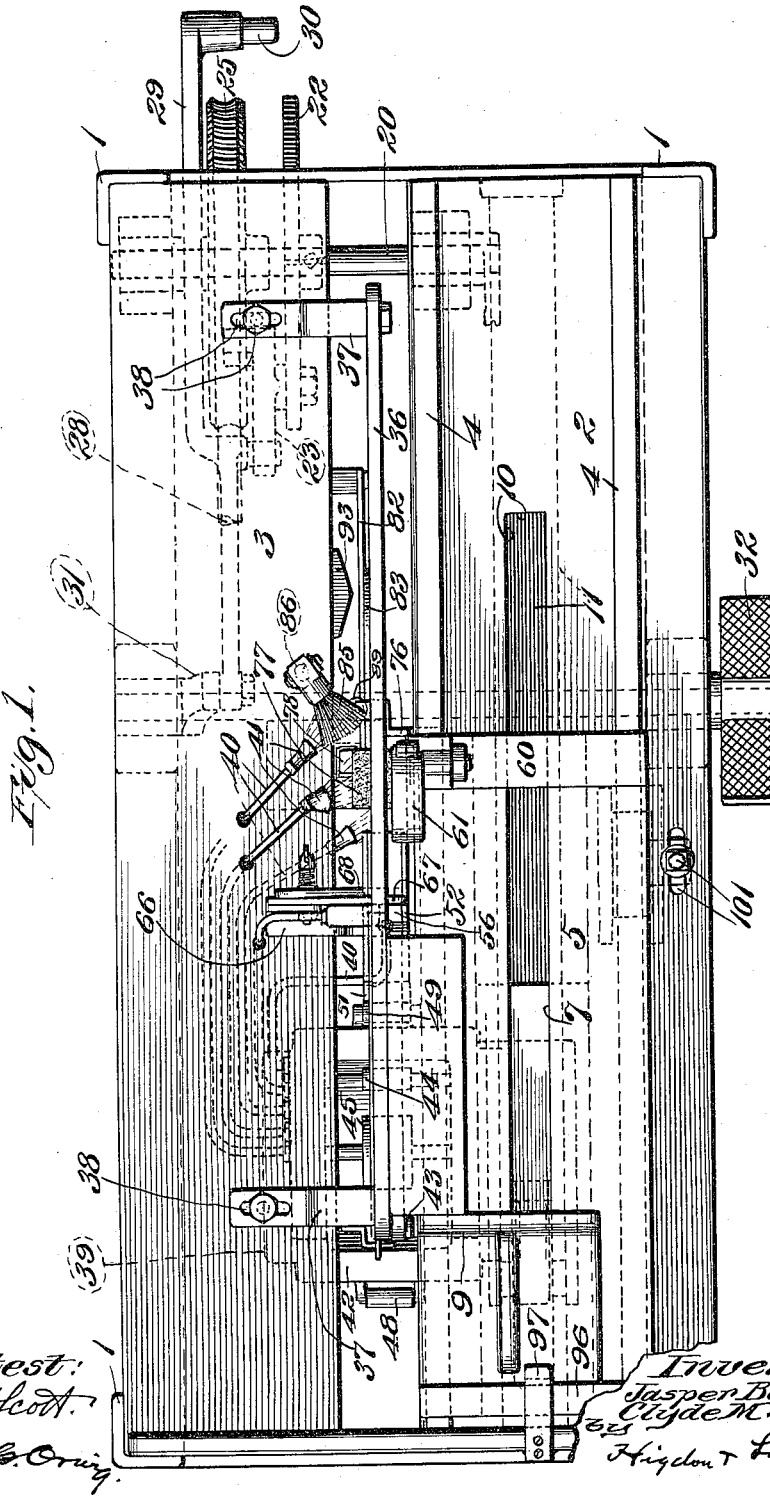

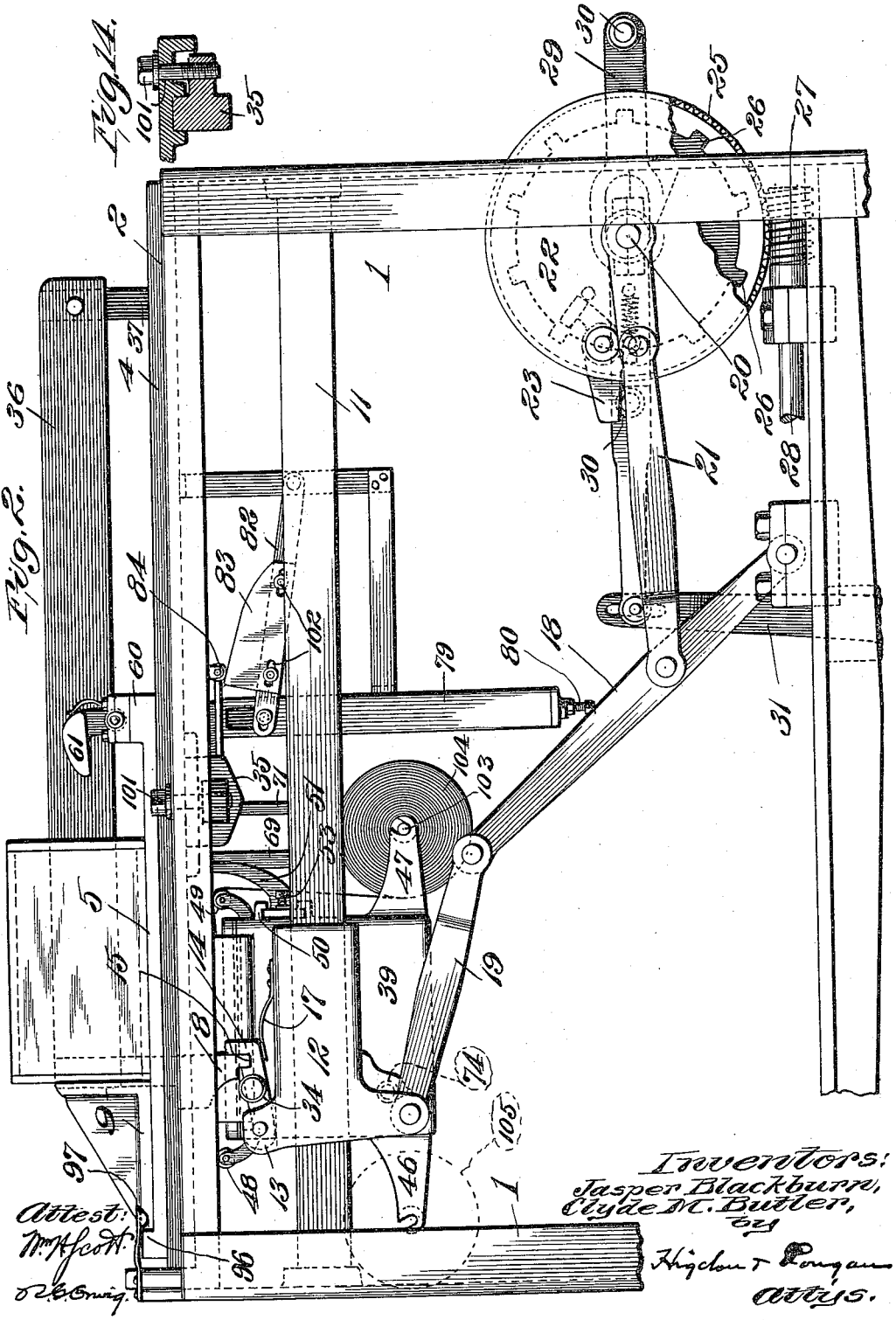

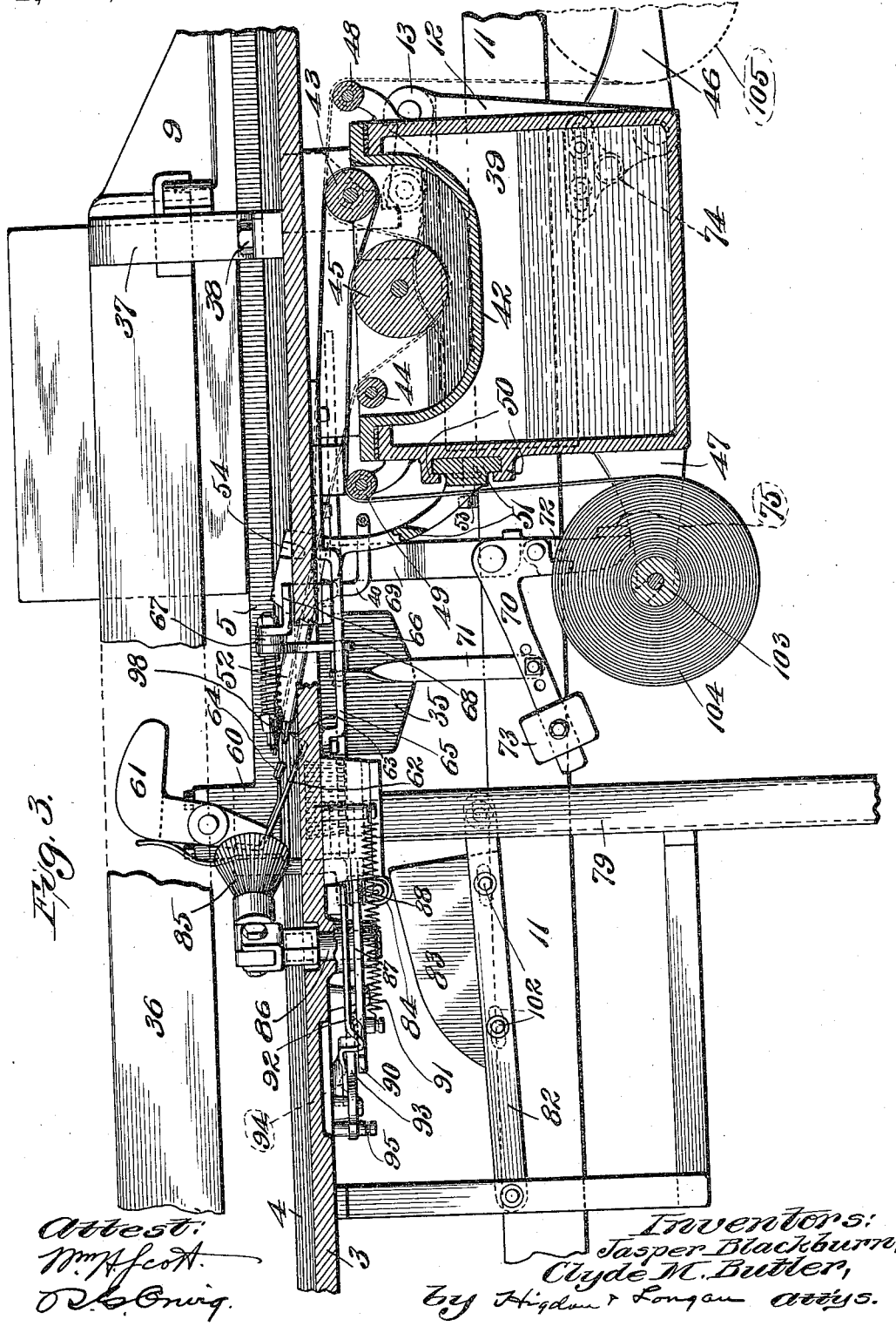

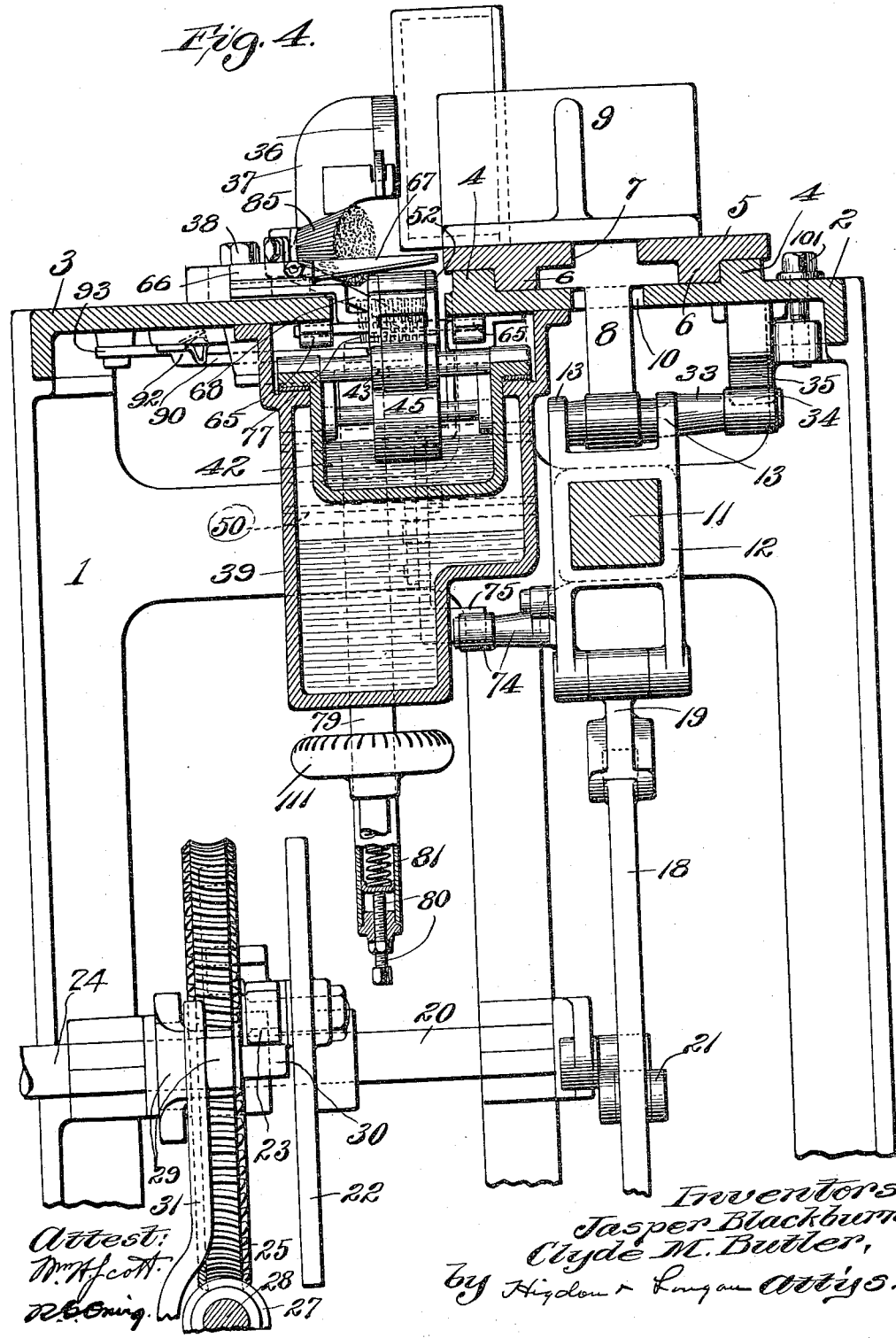

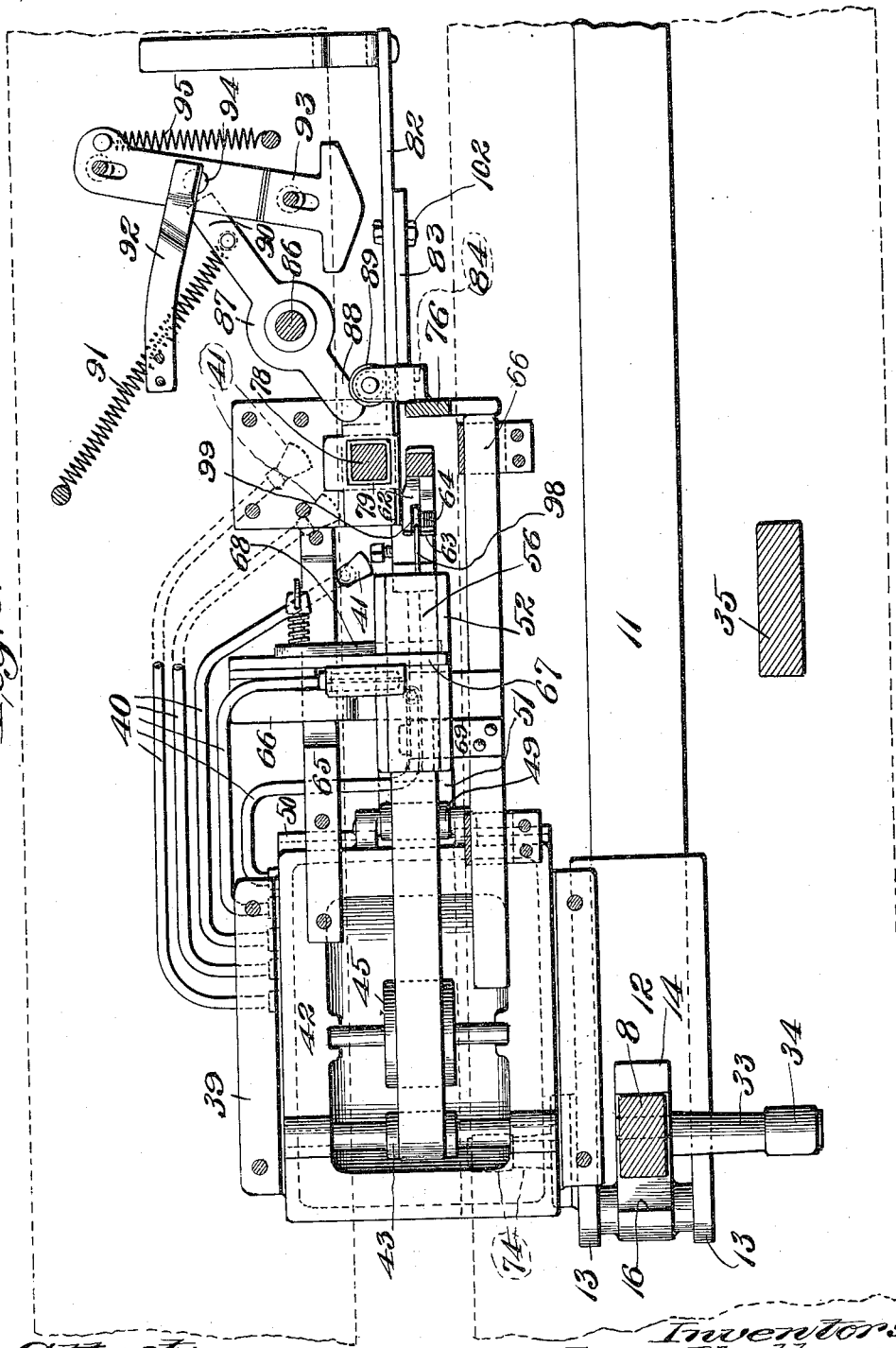

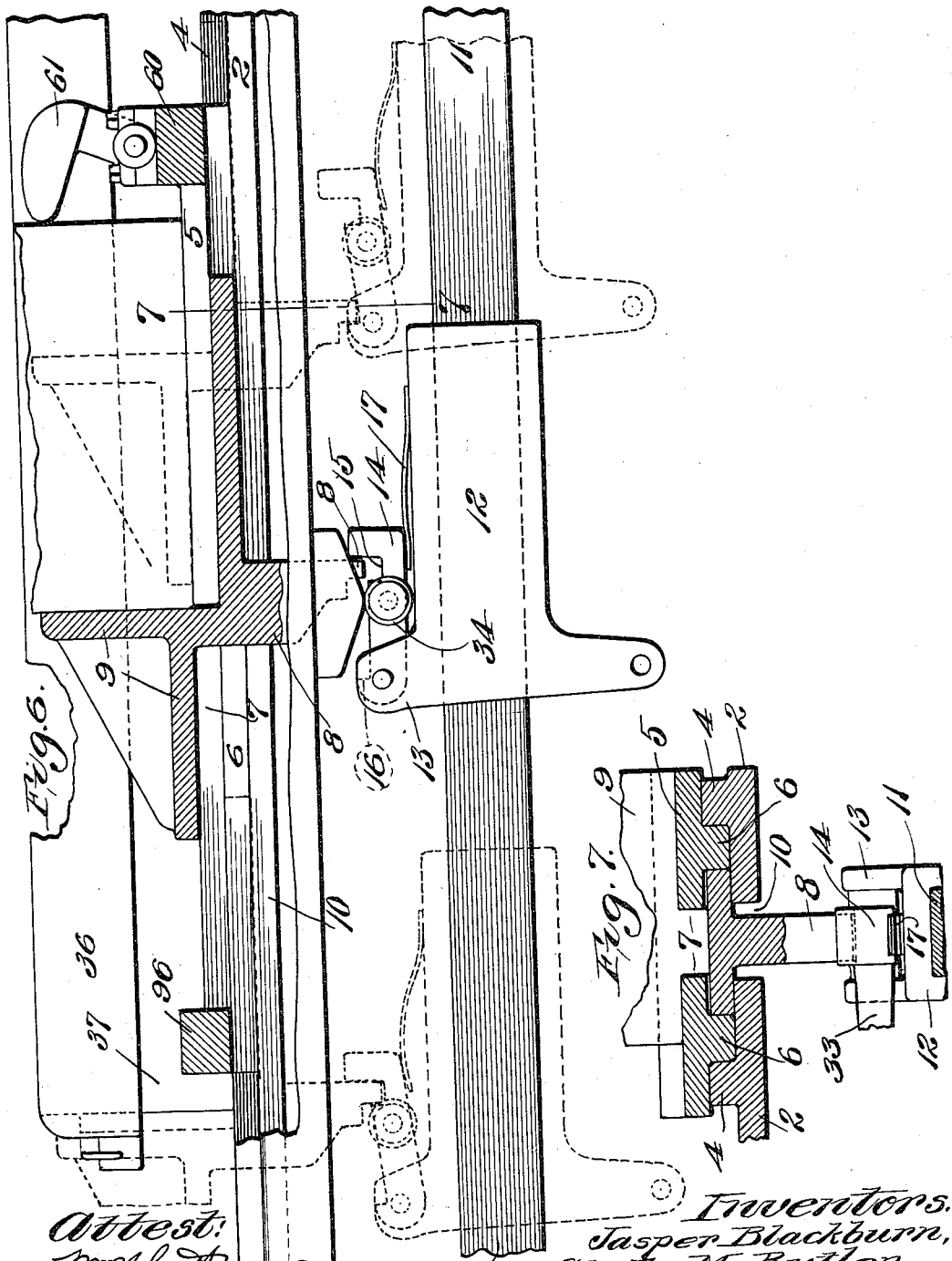

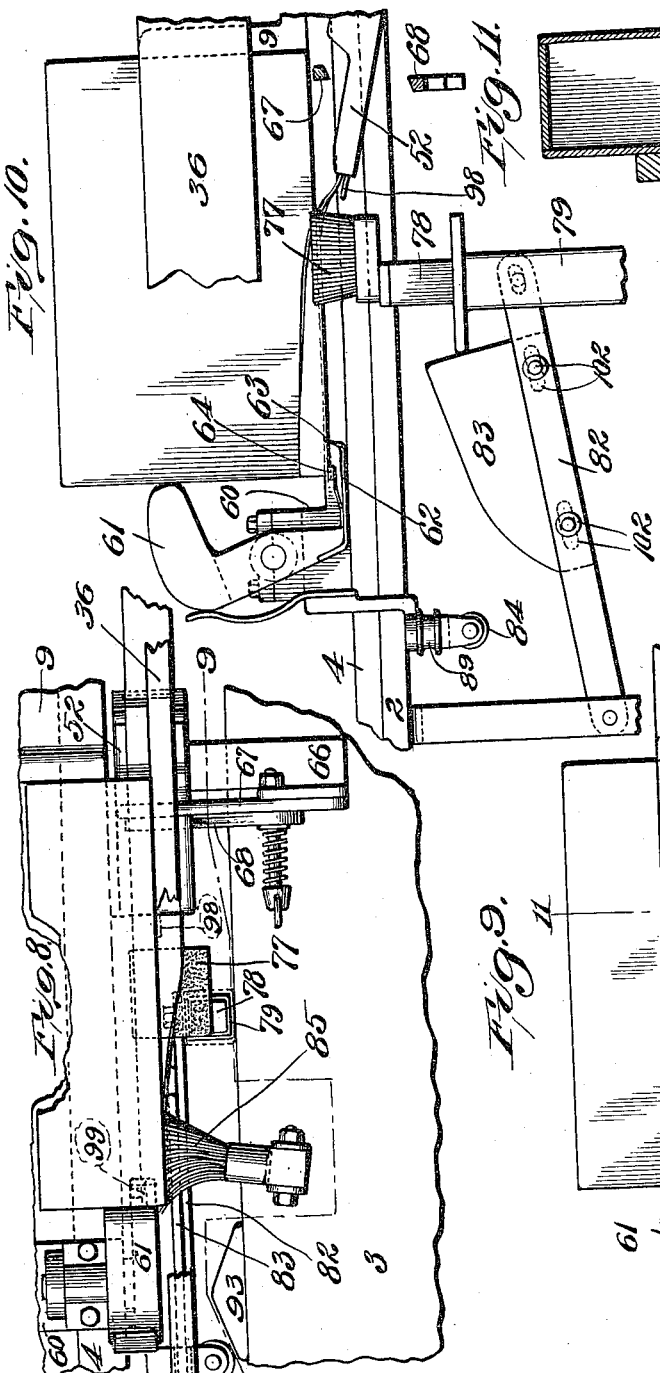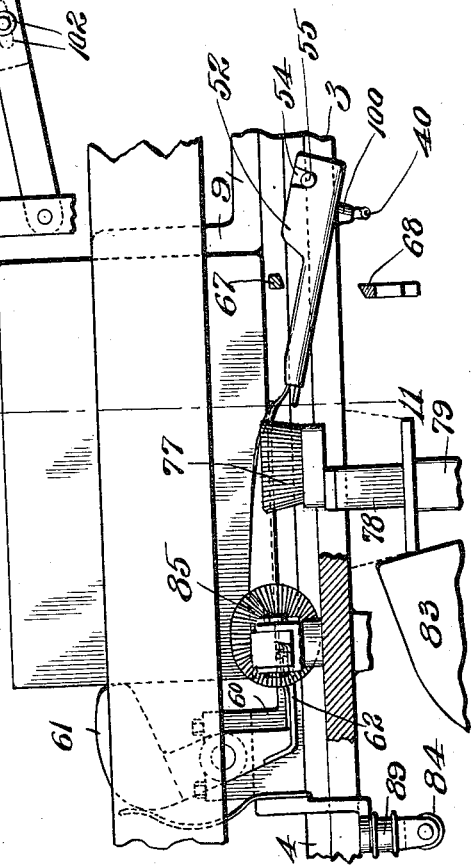

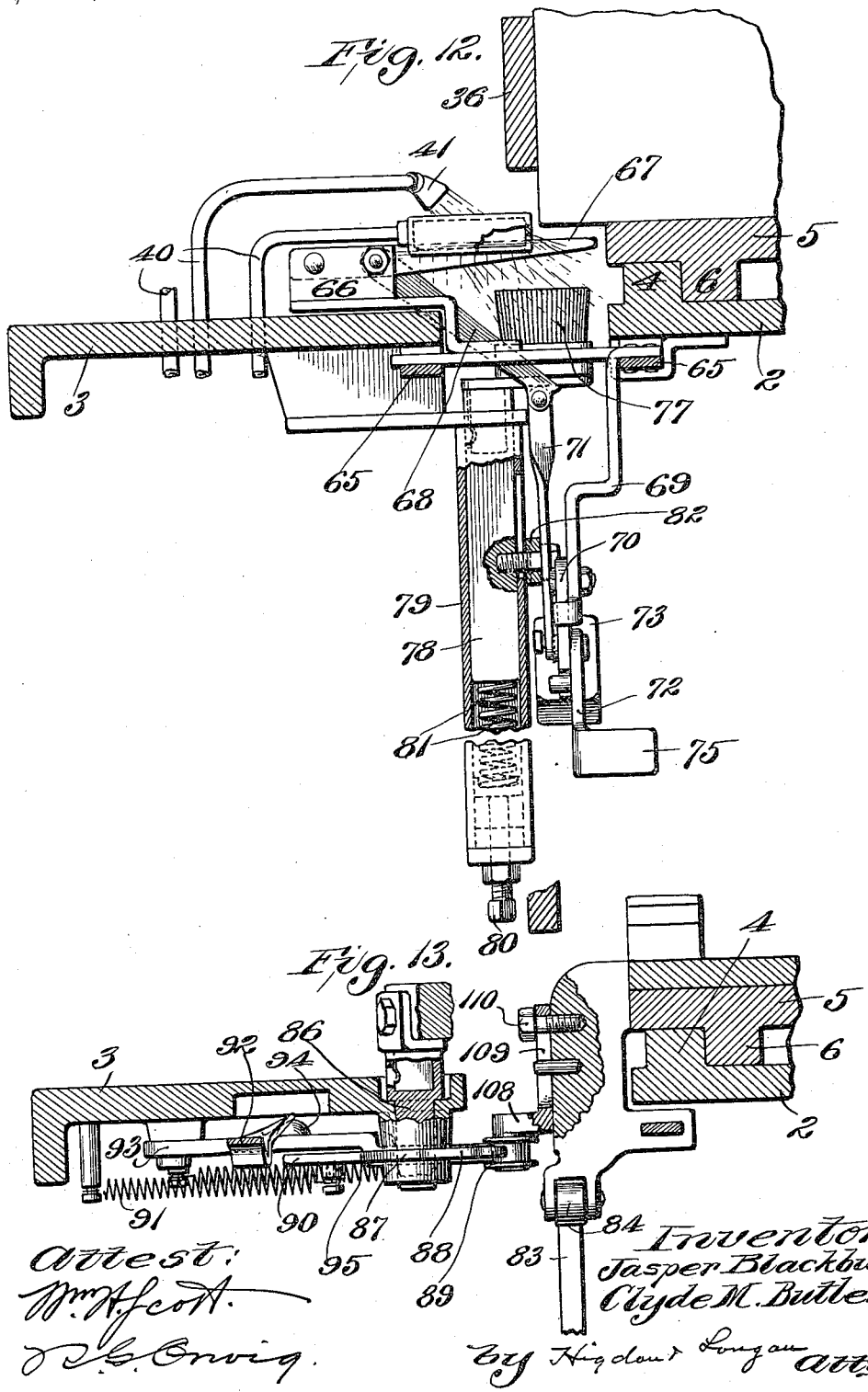

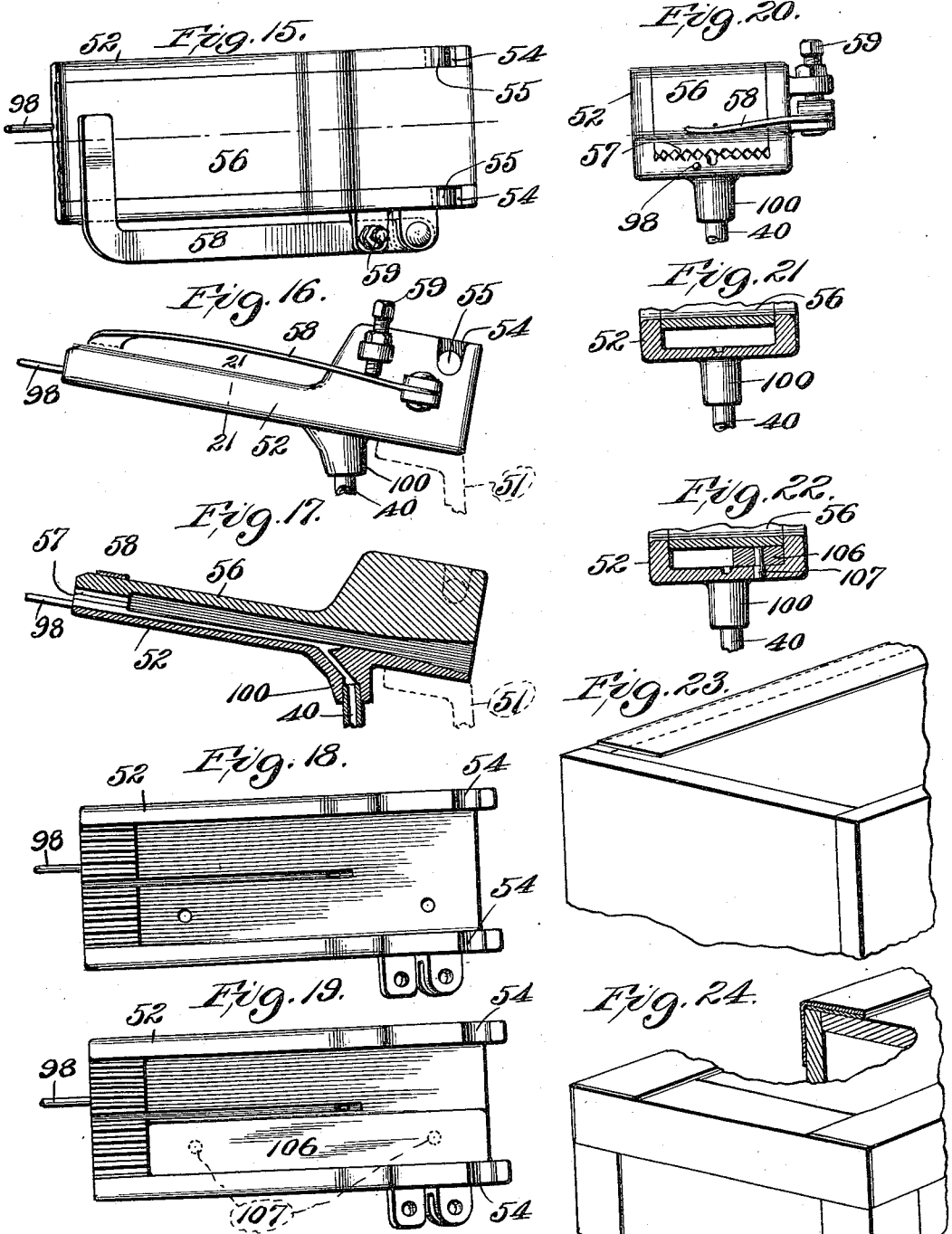

JASPER BLACKBURN, OF WEBSTER GROVES, AND CLYDE M. BUTLER, OF ST. LOUIS, MISSOURI, ASSIGNORS OF TWENTY-FOUR ONE-HUNDREDTHS TO SAID BUTLER, FIFTY-TWO ONE-HUNDREDTHS TO SAID BLACKBURN, AND TWENTY-FOUR ONE-HUNDREDTHS TO JOHN W. TOLLAND, OF ST. LOUIS, MISSOURI.

BOX HINGING AND TAPING MACHINE.

1,174,963.   Specification of Letters Patent.   Patented Mar. 14, 1916.

Application filed January 26, 1915.   Serial No. 4,546.

*To all whom it may concern:*

Be it known that we, JASPER BLACKBURN and CLYDE M. BUTLER, citizens of the United States, and residents of Webster Groves, St. Louis county, Missouri, and St. Louis, Missouri, respectively, have invented certain new and useful Improvements in Box Hinging and Taping Machines, of which the following is a specification containing a full, clear, and exact description, reference being had to the accompanying drawings, forming a part hereof.

Our invention relates to improvements in box hinging and taping machines, wherein a moving carriage is arranged to support the box or article to be taped; shears provided for the severing of tape in lengths proportionate with the article and brushes arranged to apply the tape, which has been previously supplied with an adhesive, to the article.

The object of the improvements is primarily to construct a machine which will supply to a tape an adhesive, automatically cut the tape in lengths proportionate with the article to be taped, and apply the adhesive tape to the article.

To the above, and other purposes which will be made clear, our invention consists in the novel details of construction and arrangement of parts hereinafter fully set forth in our specification, pointed out in our claims and illustrated by the accompanying drawings, in which—

Figure 1 shows in plan a machine embodying our invention; Fig. 2 is an elevation of the machine, certain parts of the frame and the driving shaft being broken away; Fig. 3 is an enlarged fragmental longitudinal sectional elevation showing the relative location of the principal functionate elements of the machine; Fig. 4 is a transverse sectional elevation of the parts shown in Fig. 3, and part of the driving mechanism and clutch; Fig 5 is a sectional plan of the machine with the top and parts carried thereon removed; Fig. 6 is an enlarged elevation of the article carriage, partly in section, showing the carriage moving means; Fig. 7 is a transverse, sectional elevation of a portion of the article carriage, its support, the power driven cross head and the connecting dog between the cross head and carriage; Fig. 8 is a fragmental plan showing the shears, brushes and tape holding fingers; Fig. 9 is a longitudinal, sectional elevation taken on the line 9—9 of Fig. 8; Fig. 10 is a fragmental elevation showing the tape holding means as in use, the initial tape applying brush and the means for raising and lowering said brush; Fig. 11 is a transverse sectional elevation taken on the line 11—11 of Fig. 9; Fig. 12 is a fragmental transverse sectional elevation showing the shears and initial tape applying brush and their operating means; Fig. 13 is a fragmental transverse sectional elevation showing the final tape applying brush support and its operating means; Fig. 14 (Sheet 2) is a detail sectional elevation of the adjustable carriage release; Fig. 15 is a plan of the tape guide; Fig. 16 is an elevation of the tape guide; Fig. 17 is a longitudinal sectional elevation of the tape guide; Fig. 18 is a plan of the lower channeled portion of the tape guide; Fig. 19 is a view similar to Fig. 18, showing a detachable filler, adapting the guide to tapes of different widths; Fig. 20 is a rear end elevation of the tape guide; Fig. 21 is a transverse sectional elevation of the tape guide taken on the line 21—21 of Fig. 16; Fig. 22 is a view similar to Fig. 21, showing the filler in place as shown in Fig. 19; Fig. 23 is a fragmental perspective of a box showing a tape hinge as applied by our machine; and Fig. 24 is a fragmental perspective, partly in section, showing a hinge and finishing tapes as applied by our machine.

Referring by numerals to the accompanying drawings: 1 designates the supporting frame of the machine, upon which are secured the spaced plates or table tops 2 and 3, the plate 2 being next the operator's, or front, side of the machine and having on its upper face the guides 4, which extend the full length of said plate and upon and between which the carriage 5 is slidably mounted. The carriage body is preferably in the form of a rectangular plate having flanges 6 arranged between the guides 4 so that the carriage will be moved in a straight course. The carriage body is provided with a longitudinal slot 7, through which there is extended a stem 8 of a follower 9 which may be moved relative to the carriage. In order that the follower may be moved, longitudinally of the machine, by means arranged beneath the table top, the top is slotted as at 10 and the follower stem 8 rides through this slot 10 as well as the slot 7 in the carriage.

Extended longitudinally of the machine beneath the table top 2, paralleling and vertically alining with the slot 10 is a bar 11, non-circular in cross section, which supports the carrier 12, which carrier has projecting upwardly therefrom a pair of spaced ears 13 between which the dog 14 is pivotally mounted. This dog has near its free end a notch 15 and near its pivotal end a shoulder 16 each of which is designed to engage the follower stem 8. The dog 14 is acted upon by a spring 17 which normally holds its free end elevated to the path of movement of the follower stem 8.

The carrier 12 is reciprocated upon the bar 11 by means of a rocker arm 18, which is pivotally secured to the machine frame and which is connected with the carrier by a link 19. The rocker arm 18 is connected with a crank shaft 20 by means of a link 21, and, said crank shaft carries a disk 22, serving as a carrier for a pawl 23 which is spring actuated to operative position. Alining with the crank shaft is a driven shaft 24 having mounted thereon a worm wheel 25, having internal notches 26 which form with said pawl 23 a clutch between the crank shaft and the driven shaft. Meshing with the worm wheel 25 is a worm 27 carried on a shaft 28, which is power driven.

In order to stop the carrier, at each limit of its movement whereby to allow time to place and remove articles to be taped, there is a bar 29 supported at its one end on the driven shaft 24 and which carries the laterally projecting stubs 30 which stand in the path of movement of the pawl 23 so that when the pawl engages either stub the clutch will be disconnected and the crank shaft stopped. The other end of this bar 29 is connected with a rocker arm 31, pivotally connected with the machine frame and having at its lower end a rocking pedal 32, a movement of which actuates the clutch.

To momentarily stop the carriage in its advance movement, while the tape is being cut by a shear mechanism hereinafter fully described, there is secured to the dog 14 a laterally projecting stub 33 having at its outer end a roller 34 and secured to the machine frame in the path of movement of the roller 34 is a cam 35 whose function is to depress the roller and stub to release the notch 15, in the dog, from the follower stem, while the carriage is being advanced and an article carried thereby is being taped, permitting the dog carrier 12 to continue in its advance to operate the tape cutting means, during the time the tape is immovable. The continued advancement of the dog brings its shoulder 16 to engage with the follower stem and the carriage is then continued in its advancement to complete the application of the severed tape to the article.

Extending lengthwise of the machine and disposed over the space between the two table top sections is an article guide 36 against which the article is rested when placed on the carriage. This guide is supported by the brackets 37, each of which is laterally adjustable relative to the top by means of the bolt and slot connection 38. The guide is by preference pivotally secured to one of the brackets and detachably secured to the other bracket so that it may be swung clear of the working parts of the machine when it becomes necessary to clean or repair them. As shown in Fig. 4, this guide 36 is laterally removed from the rear margin of the carriage, so that the article extends beyond the carriage in order that the tape may be applied thereto, and the lateral adjustment of the guide is to provide for different widths of tapes.

Suspended from the table top is a steam boiler 39, from the dome of which there extend pipes 40, terminating in jets 41 which play upon certain of the parts of the machine, as will be explained. Arranged over the top of the steam boiler is a glue pot 42, at each end of which near its top are the direction rollers 43 and 44, and near the center of which is a relatively large direction roller 45. Secured to the steam boiler are the journal bearings 46 and 47, and over which are arranged respectively the direction rollers 48 and 49. On the outer face of the right hand wall of the steam boiler is a pair of flanges 50, between which there is slidably carried a bracket 51, at the outer, free, end of which there is supported a channeled tape guide 52. This bracket is held against lateral movements by the set screw 53, by which the guide may be fixed in different positions relative to the article carried. At the end of the tape guide next its support its side walls are increased in height and have therein open topped slots 54 which form bearings for the trunnions 55 of a tape holder 56, whose free end is longitudinally ribbed, as at 57, as is also the free end of the channeled guide.

Bearing upon the tape holder is a leaf spring 58, whose tension may be varied as desired by the set screws 59. The function of this holder is to bear on the tape with sufficient tension to prevent any retrograde movement of the tape, yet sufficiently free to permit travel of the tape. The ribbed ends of the guide and holder permit the passage of the tape without wiping the adhesive therefrom. At the right hand end of the carriage there is a transverse rib 60 which serves as a stop for the article carried by the carriage, between which rib 60 and the follower the article is held while being taped.

Pivotally secured to the rib 60 in alinement with the tape guide is a rocker 61 having at its lowermost end an elastic finger 62, having the pointed projections 63 which are adapted to engage the tape and clamp it against the article, whereby when the tape is secured to the article it will be drawn with it for the length of the article. In order that the end of the tape be held to the article in advance of the elastic finger, we provide the elastic presser block 64, which is carried by the elastic finger 62 and is automatically operated therewith.

65 designate guides disposed lengthwise of the machine, in which there is slidably supported a shear block 66, which rigidly carries a fixed blade 67 and a pivotal blade 68. Depending from this shear block is an arm 69, to which is pivotally secured a bell crank 70, which is connected with the pivoted shear blade by a link 71 and which bell crank carries on its lowermost arm a knuckle jointed operating arm 72. The bell crank 70 carries a weight 73 which serves to hold the bell crank against rocking during the time the shear block is being moved. The dog carrier 12 has a laterally projecting stub 74 which is brought to engage with an arm 75 carried by the knuckle jointed operating arm 72.

To return the shears to their initial position there is carried by the article carriage an arm 76 which when the article carriage is in its return movement engages the shear block 66 and slides it to its initial position, as shown in Fig. 5. To apply or affix the adhesive tape to the article there is a brush 77, which is carried on a stem 78 vertically slidably mounted in a sleeve 79 depending from the table top. In the lower end of the sleeve 79 there is an adjusting screw 80 between which and the stem there is an extensile coil spring 81 which serves to hold the stem and its brush elevated to functionate positions. To depress the brush 77 to permit the tape holder to ride thereover, there is provided a pivoted lever 82, which is also connected with the brush stem and which carries a cam 83 lying in the path of a roller 84 carried by the carriage, so that a retrograde movement of the carriage will depress the brush 77 and permit the tape holder to move thereover. When the machine is applying the cloth hinges this brush 77 engages the hinges and bears them against the article while the article is moved its length. This same action takes place, and by the brush 77, when corner tapes are being applied, and in addition to this act the brush partially turns the tape around the corner of the article, which turned portion of the tape is secured by a secondary brush 85. This brush 85 is carried on a stem 86 which is rotatably mounted on the machine frame to the right of the primary brush and which stem 86 has connected therewith a lever 87 arranged for the movement of the brush. The end 88 of this lever lies in the path of a roller 89 carried by the article carriage so that when the carriage is moved to its starting point the brush will be swung away from the article carrier. The other end 90 of this lever has connected therewith a spring 91 which normally tends to hold the brush swung to a position against an article on the carriage. In the path of the end 90 of the secondary brush lever is a spring latch 92 whose function is to hold the brush, against the action of the spring 91. To release the spring latch 92 there is provided a slide bar 93 having thereon a boss 94 which when moved releases the spring latch from the brush lever, at which time the spring 91 acts to swing the brush into engagement with the upturned margin of a corner tape and causes it to be adhered to the article. The slide bar 93 is acted upon in one direction by a spring 95 and in its other direction by the roller 89 movable with the article carrier.

In order to hold the carriage stationary during the time the follower is moved to engage the article on the carriage, we provide a rib 96 at the left hand end of the carriage which is engaged by a leaf spring 97, which spring simply acts as a friction brake to hold the carriage from being dragged with the follower until such time as the follower meets the article when the carriage is moved by the article. This rib 96 also serves as a means together with the follower 9 for returning the carriage to its initial position.

At the free end of the tape guide there is a pin 98 which serves to support the tape after it leaves the guide. This pin lies in the path of movement of the tape gripping finger 62, which is slotted as at 99 so that it may be moved to a position beneath the pin 98 and the tape end supported thereby whereby to pick up and carry it to the article.

One of the steam nozzles or jets 41 referred to connects with the tape guide 52 as shown in Fig. 17 by means of an internally threaded boss 100 on the tape guide which communicates with a slot in the upper face of the guide extending from the boss to the free end of the guide. The discharge of moist steam maintains the guide in condition to permit the free movement of the tape through the guide. In other words, this play of live steam on and through the tape guide keeps the glue or adhesive from congealing. The other jets or nozzles play on the shears, the brushes or wipers which apply the adhesive tape to the article and the presser block which applies the tape to the article in advance of the gripping finger so that all of said parts are kept in working condition.

The timing of the operation of the cutting mechanism may be varied by shifting the cam 35 lengthwise of the machine, and this shifting is made possible by reason of the bolt and slot connection 101 between the cam and the table top 2. To provide for a variation of the timing of the lowering of the primary tape applying brush 77, the cam 83 is shifted lengthwise of the machine by means of the bolt and slot connections 102 with its supporting lever 82.

In Fig. 3 there is shown a shaft 103 supported in the left hand brackets 47, supporting a roll 104 of finishing tape. This tape is drawn from the roll over the direction roller 49, thence over the roller 45 which supplies its one face with adhesive and thence over the direction roller 43 which inverts the tape, that is, turns the adhesive side up so that it may be adhered to the under face of an article supported on the carriage. In this same figure (3) there is shown by dotted lines a roll 105 of cloth tape, to be employed for hinging purposes, such as the lid on a cigar box. This tape is extended over the direction roller 48, over the roller 43 and thence under the roller 45 which carries the tape through the adhesive, so that both of its faces are supplied. From the roller 45 the tape is directed over the roller 44 and thence to the tape guide. In practice it has been found that the (paper) finishing tape will carry sufficient of the adhesive in a moist condition from its source to the article, but the (cloth) hinge tape, due to its porosity, must be thoroughly saturated, hence it is run through the body of adhesive.

The channeled tape guide 52 has a width equal to the paper or finish tape and to adapt it to properly guide the cloth tape, which is narrower than the finish tape, we employ a filler block 106 carrying the dowels 107, whereby it may be readily detachably secured to the guide proper.

The primary tape applying brush 77 alone is necessary in applying the cloth hinge and for this reason we provide means whereby to render inoperative the secondary brush 85, which consists in a block 108, having the roller 89 journaled therein, provided with a slot 109 through which a set screw 110 is passed and seated in the carriage frame, whereby when the secondary brush is to be thrown out of operation this roller is moved out of the path of the lever 87 and slide bar 93.

Arranged beneath the steam boiler 39 is a burner 111 which is connected with a source of fuel supply, not shown, and this burner is operative during the time the machine is at work to supply the functionate parts with live steam, as well as to keep the adhesive in working condition.

This machine performs the functions of applying cloth hinges to boxes and the like, as well as applying paper tapes to finish the corners of the boxes, and is primarily designed for use in connection with cigar boxes, wherein the cloth hinges are applied before the finishing tapes, and in this order we will describe the full operation of the machine.

Assuming the burner to be operating and the steam jets all playing on the various functionate parts of the machine, the shaft 28 connected with power, and the carriage, follower and shears at their left hand limits of movement, the follower stem engaged by the notch 15 of the dog, the brush 77 depressed and the secondary brush held out of the path of the box to be taped, the operator places a box on the carriage between the rib 60 and follower 9 so that its point of application to the hinge is faced downwardly and projects beyond the rear margin of the carriage, the guide 36 serving to limit and determine the distance the box projects. The pedal 32 is depressed and through the rocker arm 31, the bar 29 is moved to release the one stub 30 from the pawl 23, which pawl engages in one of the notches 26 of the worm wheel and carries the pawl and disk 22 with it until the pawl reaches the other stub 30, which second stub again releases the pawl from the worm wheel. As the pawl is thus carried with the worm wheel, the disk 22 rotates the crank shaft 20 and through the links 21 and 19 and rocker arm 18, the carrier 12 is moved over the bar 11 to its right hand limit of movement. While the carrier 12 is thus being moved the pawl 14 by its engagement with the stem 8 moves the follower 9, which when the article carried thereby meets the rib 60 advances the carriage.

The follower is first moved up to the article or box, and the carriage temporarily held against movement by the brake 97. After the follower engages the box its continued movement causes the box to engage and move the rocker 61, thereby elevating the slotted finger 62, the pointed projections of which pick up the adhesive tape and carry it to and pin it to the box so that as the box is moved by the follower, advancing the article against the rib 60 of the carriage the tape is drawn from the tape guide. At the time the tape holder is operating the end of the tape beyond the holder is pressed and caused to adhere to the box by the presser block 64. As the carriage is thus being moved the roller 84 is moved from the cam 83 and the spring 81 forces the primary brush against and secures the tape to the box throughout its length. Before the carriage reaches its right hand limit of travel the stub 74 of the dog carrier engages the arm 75 of the shear block in order to move the shears to their right hand limit of movement, the weight 73 serving to prevent a breaking of the knuckle joint of the arm 75 during this movement. When the shear block reaches its limit of movement, the stub 74 continues to bear against the arm 75, whereupon the knuckle joint holds the arm rigid and rocks the bell crank lever 70 through which the link 71 operates the movable shear blade 68 to cut the tape. During the time of this cut, the carriage is held immovable, and this step is made possible by the cam 35 which engages the stub 33 and depresses the dog 14, freeing it from the follower stem, so that the carriage will be thereby stopped until the shoulder 16 of the dog again engages the follower stem to cause the carriage to move its full stroke and permit the brush to apply the cut tape to the terminal end of the box. The carriage is then temporarily stopped to permit the removal of the box, and the pedal is then depressed to actuate the clutch and thus connect the rocker 18 with power to move the carrier 12 toward the left hand end of the machine, which carrier through the pawl 14 and stem 8 moves the follower against the rib 96 and the carriage is thus moved to its initial position.

The operation of applying the finishing tapes to the box is in all particulars the same as with the hinge tapes except for the brushes, and this difference results from the fact that the cloth hinge is applied to one face only of the box, while the finishing tape is applied to right angled adjacent faces, the carriage movement, the shear movement and the one brush movement being the same in both cases. When the finishing tape is applied one-half is secured to the underneath face of the box and the other half is partially turned by the brush, as clearly shown in Fig. 11, to approximate the upright face of the box, whereupon the secondary brush 85 acts to finally apply this partially turned portion of the tape to the upright face of the box. Each return movement of the carriage causes the shears to be moved in advance of the tape guide in order to permit the gripping finger to engage beneath the end of the tape projecting beyond the tape guide. The shears are then returned to their initial position by the engagement of the depending arm 76 of the article carriage with the shear block when the carriage is moved rearwardly after having completed a taping act.

Having thus described our invention, what we claim as new therein and desire to secure by Letters Patent of the United States is:

1. In a machine of the class described, a movable carriage, means for directing a tape to the underneath face of an article supported on the carriage, tape gripping means movable with the carriage, a follower on the carriage arranged to cause the article to be moved toward and operate the tape gripping means, means for applying said tape length to the article, and means for severing the tape in lengths proportionate with the face of the article to be taped.

2. In a machine of the class described, a movable article carriage, a fixed tape guide, a tape support at the delivery end of said guide, tape severing means, means operable by the carriage for moving said severing means beyond said tape support and then operating the same to sever the tape, tape gripping means movable with the carriage, said gripping means capable of being moved vertically relative to the tape support from a point therebeneath, and means for applying said tape to the article.

3. In a machine of the class described, an article supporting carriage, means for running and guiding the carriage in a definite course, a tape guide, means adjacent the forward end of the carriage for gripping and moving the tape from the guide to the article on the carriage, means for automatically severing the tape in lengths proportionate with the article, means for wiping the tape to the article, and means for automatically moving said wiping means out of the path of said gripping means at times.

4. In a machine of the class described, a movable article carrier, means for guiding an adhesive tape to an article on said carrier, means for initially mechanically securing said tape to the article, means for severing the tape in lengths proportionate with the article, a wiper for applying the adhesive tape to one face of the article, and a second wiper for applying the tape to a face adjacent to and at an angle to the first mentioned face of the article.

5. In a machine of the class described, an article carrier, a tape guide to direct a tape so that a portion of its width will vertically aline with the one margin of an article on the carrier, a brush for wiping said portion of the tape to the mentioned face of the article and bend the remaining portion of the tape to approximate an adjacent angularly disposed face of the article, and a second brush for wiping said bent portion of the tape on said angularly disposed face of the article.

6. In a machine of the class described, an article carrier, a tape guide to direct a tape so that a portion of its width will vertically aline with the one margin of an article on the carrier, a brush for wiping said portion of the tape to the mentioned face of the article and bend the remaining portion of the tape to approximate an adjacent angularly disposed face of the article, a second brush for wiping said bent portion of the tape on said angularly disposed face of the article, and means for rendering the said second brush inoperative at times.

7. In a machine of the class described, a carriage, a tape gripping means movable with the carriage and comprising a rocking element engageable by the article for its movement, and a yielding tape engaging element.

8. In a machine of the class described, a tape guide, means for preventing retrograde movement of the tape in said guide, a projection at the free end of said guide, an article carriage, and a tape gripping means carried by the carriage and comprising a slotted element arranged to be extended beneath said projection and moved vertically therebeyond, whereby the gripping means may be moved beneath the end of the tape supported by said projection and then carry said tape end to the article on the carriage.

9. In a machine of the class described, an article carriage, a guide to direct an adhesive tape to a point beneath said carriage, means movable with said carriage for engaging the end of the tape in said guide and drawing said tape with said carriage, a tape applying means, and automatic means for moving said tape applying means out of the path of said tape engaging means at times.

10. In a machine of the class described, a pair of tape applying means, a carriage for the support of an article to be taped, means movable with the carriage for the operation of both of said tape applying means, one at least of said last mentioned means movable with the carriage being adjustable to render one of the brushes inoperative.

11. In a machine of the class described, a sliding carriage, a guide laterally removed from and in a plane above the path of said carriage, a tape guide arranged beneath said carriage with its delivery end partially beneath and partially extended beyond the carriage toward said guide, a tape engaging means movable with the carriage, and brushes for applying said tape to an article on the carriage.

12. In a machine of the class described, an article carriage, a rocker on said carriage, an elastic finger on said rocker arranged to mechanically secure a tape to an article on the carriage, and a presser block movable with said finger for applying an adhesive tape to the article in advance of said finger.

13. In a machine of the class described, an article carrier, means movable with the carrier for mechanically securing an adhesive tape to the underneath face of an article on the carrier, a vertically movable brush for applying said adhesive tape to one face of the article, and a laterally swinging brush for applying the said tape to a vertical face of the article.

In testimony whereof, we have signed our names to this specification, in presence of two subscribing witnesses.

JASPER BLACKBURN.
CLYDE M. BUTLER.

Witnesses:
EDWARD E. LONGAN,
E. L. WALLACE.

Copies of this patent may be obtained for five cents each, by addressing the "Commissioner of Patents, Washington, D. C."